United States Patent
Deilmann et al.

(10) Patent No.: US 9,146,142 B2
(45) Date of Patent: Sep. 29, 2015

(54) DEVICE FOR DETERMINING THE FLOW RATE ACCORDING TO THE FLOAT PRINCIPLE

(71) Applicant: KROHNE Messtechnik GmbH, Duisburg (DE)

(72) Inventors: Michael Deilmann, Essen (DE); Philipp Mertmann, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 308 days.

(21) Appl. No.: 13/772,771

(22) Filed: Feb. 21, 2013

(65) Prior Publication Data

US 2014/0157886 A1    Jun. 12, 2014

(30) Foreign Application Priority Data

Dec. 6, 2012  (DE) .......................... 10 2012 023 861

(51) Int. Cl.
| | |
|---|---|
| G01F 1/00 | (2006.01) |
| G01F 1/05 | (2006.01) |
| G01F 1/68 | (2006.01) |
| G01F 1/22 | (2006.01) |
| G01F 15/02 | (2006.01) |

(52) U.S. Cl.
CPC .. *G01F 1/05* (2013.01); *G01F 1/00* (2013.01); *G01F 1/22* (2013.01); *G01F 1/68* (2013.01); *G01F 15/02* (2013.01)

(58) Field of Classification Search
CPC ............. G01F 1/00; G01F 1/28; G01F 1/115; G01F 1/22; G01F 23/28; G01F 23/66; G01F 23/58; G01F 3/16; G01F 1/684; G01F 1/969; G01F 1/692; G01F 1/007; G01F 1/34

USPC .............. 73/204.11, 861, 861.76, 861.77, 73/861.71, 861.57, 861.56, 305, 314, 315, 73/239

See application file for complete search history.

(56) References Cited

U.S. PATENT DOCUMENTS

| | | | | |
|---|---|---|---|---|
| 4,475,407 | A * | 10/1984 | Kruncos | 73/861.53 |
| 5,115,684 | A * | 5/1992 | Haeussler | 73/861.48 |
| 5,747,702 | A * | 5/1998 | Kadlicko | 73/861.53 |
| 7,644,632 | B2 * | 1/2010 | Best | 73/861.01 |
| 2004/0204870 | A1 * | 10/2004 | Schimnowski et al. | 702/45 |

FOREIGN PATENT DOCUMENTS

DE    33 41 460 A1    5/1985

OTHER PUBLICATIONS

Kobold, Variable Area Flowmeter, DE3341460.*
Waram Stoeckel, Thermo Variable Rate Springs: A New Concept for Thermal Sensor-Actuators, Springs—The Magazine of Spring Technology, vol. 30, Nr. 2, pp. 35-43, Oct. 1991.

* cited by examiner

*Primary Examiner* — Lisa Caputo
*Assistant Examiner* — Nigel Plumb
(74) *Attorney, Agent, or Firm* — Roberts Mlotkowski Safran & Cole, P.C.; David S. Safran

(57) ABSTRACT

A Device for determining the flow of a flowing medium according to the float principle with at least one floating body and at least one measuring tube with medium flowing through it, wherein the floating body is movable in the measuring tube along an axis (4). To provide a device for measuring the flow rate according to the float principle that, in certain areas, shows insensitivity to changes in properties of the medium or changes of process variables affecting the properties of the medium, an actuating element is provided that acts upon the floating body depending on at least one property of the medium and/or depending on at least one process variable acting on a property of the medium.

3 Claims, 2 Drawing Sheets

DEVICE FOR DETERMINING THE FLOW RATE ACCORDING TO THE FLOAT PRINCIPLE

BACKGROUND OF THE INVENTION

1. Field of the Invention

The invention relates to a device for determining the flow of a flowing medium according to the float principle. Here, the device has at least one floating body and at least one measuring tube with medium flowing through it. The floating body is movable in the measuring tube along an axis.

2. Description of Related Art

Measuring devices that determine the flow of a medium—particularly a fluid, such as liquids or gases—by means of the float process have, in most cases, a measuring tube that is arranged vertically—i.e., in the direction of gravity—or is alternatively arranged horizontally. The measuring tube, through which a medium to be measured flows, usually has a conical interior that widens in the flow direction, in which the movable floating body is arranged along the direction of flow.

The flowing medium—in the case of a vertically oriented measuring tube—exerts a force in the flow direction on the floating body, which is dependent on the flow resistance of the floating body. Additionally, the buoyancy of the floating body acts in the direction of flow. The weight force acts opposite the direction of flow, so that three forces act on the floating body: two in the direction of flow and one in the opposite direction. According to transient response, the floating body remains at a level in which the three forces are just balanced. Since the position is dependent on this, i.e., the position of the floating body in the measuring tube is dependent on the flow of the medium, this value allows for conclusions about the flow.

If the measuring tube is arranged horizontally, the lack of a weight force is replaced by the spring force of a spring that acts on the floating body.

The height can be determined, for example, in that the floating body is arranged in an inspection glass, which is provided with a corresponding scale. It is described in patent DE 196 39 060 C2 that the determining of position occurs via a permanent magnet connected to the floating body.

The flow of the medium is obtained from the determined height dependent on a flow coefficient $\alpha$. The flow coefficient $\alpha$ is dependent on the geometric shapes of the measuring tube and the floating body and on the Ruppel number Ru, which incorporates medium-specific parameters such as viscosity and density (see, for example, German Utility Model DE 83 17 576 U1). For the implementation of the measuring principle, a data set with the flow coefficient $\alpha$ is determined depending on the height h and the Ruppel number Ru for the medium to be measured or for a plurality of possible media and stored for evaluation, thus, specifically for each measuring device type, i.e., for identical instruments.

The disadvantage is that many media have a viscosity that is dependent on temperature. For most liquids, the viscosity decreases with increasing temperature, so that less friction force can be transferred to the floating body. As a result, the floating body moves toward its rest position, which would be associated with reduced flow.

A relatively complex design of a variable-area flowmeter can be seen in German Patent Application DE 33 41 460 A1, in which the media is partly lead through a bypass that is opened and closed by a valve assembly dependent on temperature.

SUMMARY OF THE INVENTION

A primary object this invention is therefore to provide a device for measuring the flow rate according to the float principle that, in certain areas, shows insensitivity to changes in properties of the medium or changes of process variables affecting the properties of the medium.

The above object is initially and essentially met according to the invention with the device in question in that at least one actuating element is provided and that the actuating element acts upon the floating body depending on at least one property of the medium and/or depending on at least one process variable acting on a property of the medium. If, in the device according to the invention, a property (e.g. viscosity) of the medium changes or a process variable (e.g. temperature) changes that has an effect on a property of the medium, then the extent to which at least one actuating element acting on the floating body also changes. The change of the extent of impact is preferably such that the change in position of the floating body, which occurs as a consequence of the change in the property of the medium or the change of a process variable affecting at least one property of the medium and which is not due to a change of flow, is just compensated. In other words: The actuating element, in each case, restores the position that would have prevailed without a change in the medium property or process variable.

In one design, the actuating element exerts a force on the floating body along the axis in the direction of flow or against the direction of flow of the medium. If, in this design, for example the viscosity of the medium changes in such a way that the medium shifts the floating body significantly more—as would be reasonable for a greater flow—then the actuating element presses more intensely—in one design—on the floating body or contributes—in an alternative design—a lower resistance to the floating body so that the floating body assumes the position that corresponds to the real flow of the medium, and which would also be set at a viscosity acting as a reference.

In one design, therefore, it is provided in particular that the actuating element exerts a force on the floating body dependent on the viscosity and/or the temperature of the medium. The force is preferably measured such that is virtually compensated to a predetermined reference viscosity, so that the flow of the medium can be calculated from the position of the floating body with the calibration data of such a reference viscosity.

The actuating element is, in one design, a spring element with a temperature-dependent spring constant. The type of change of the spring constant is synchronized with the change of the viscosity of the medium to be measured, wherein, if necessary, the use of specific temperature ranges is limited. As an example, a shape memory alloy is used as material. In an alternative design, the actuating element, for example, consists in part of an electromagnetic system, which for example, has a corresponding temperature control.

The actuating element is arranged between the floating body and a support element for the application of force on the floating body, in one design.

In general and independent of the particular embodiment, the device according to the invention can be used with either a horizontally or vertically oriented measuring tube.

In one design, at least two actuating elements are provided, which act on the floating body from different sides along the axis. Both actuators are identical in one variation and, for example, designed according to one of the above designs. In an alternative variation, the two actuators are different.

One design enables an electronic determination of the flow in that at least one position-determining unit is provided that determines the position of the floating body. For example, an evaluation unit calculates a value for the flow of the medium with the measurement data. Alternatively an inspection glass is provided, which allows a visual determination of the height of the floating body, for example by a user. Here, in one variation, the value of the flow can be read directly from the scale provided on the inspection glass, attuned to the specific medium.

Additionally, in one design, at least one temperature sensor is provided for determining the temperature of the medium. Using such a temperature measurement, for example, the degree of influence of the at least one actuating element can be adjusted to the floating body or for example, use can be monitored when the temperature compensation is limited to a range of temperatures by the actuating element.

In detail, there are a variety of options for designing and further developing the device according to the invention. Reference is made, on one hand, to the claims subordinate to claim 1, on the other hand, to the following description of embodiments in conjunction with the drawing. The drawing shows

DETAILED DESCRIPTION OF THE INVENTION

Figure 1:
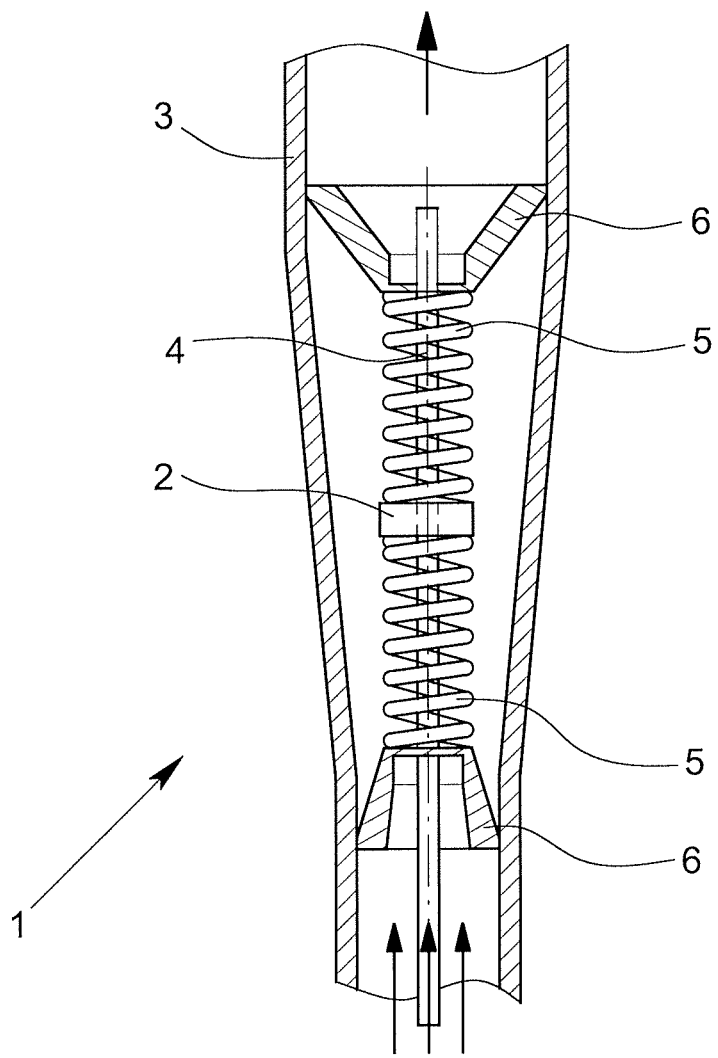
FIG. 1 schematically shows a portion of a apparatus for measuring the flow in cross section and FIG. 2 is a schematic representation of a device for measuring the flow.

FIG. 1 shows a part of a device 1 for determining the flow of a medium according the float principle which has, for measurement, a floating body 2 that is arranged in a partially conically widened measuring tube 3, which has medium flowing through it—in the illustrated version from the bottom upwards. The floating body 2 is movable along the axis 4, and here, is especially rotationally symmetrical.

With this vertical arrangement of the measuring tube 3, the position of the floating body 2 is dependent on the weight force acting on it, the buoyancy and the flow of the medium. Alternatively, the measuring tube 3 can also be arranged horizontally, in which case, typically, the lack of effect of the weight force is then replaced by a spring that acts against the direction of flow.

The problem is that the viscosity of the medium affects the position of the floating body 2, and thus, also the calculated flow. Since in many media, the dependence of the viscosity on the temperature as process variable is known, a corresponding correction of the calculated flow rate value can, thus, be made based on a temperature measurement.

Such a conversion is avoided in the illustrated device 1 by means of a relatively simple arrangement, and in particular, with a direct effect in that, in the illustrated embodiment, compensation of an effect of a change in the viscosity of the medium is made directly relative to the position of the floating body 2. Therefore, the device according to the invention allows, for example, the direct reading of the flow, because the impact of a change of viscosity on the height of the floating body 2 is quasi corrected "online".

An actuating element 5 is provided in the illustrated embodiment of the measuring device 1 on each side of the floating body 2 along the axis 4, which exerts a force on the floating body 2 for compensation. The actuating elements 5, here, are designed as spring elements, which, in each case, are supported by a support element 6 that is connected to the inner wall of the measuring tube 3. In an alternative embodiment only one actuating element 5 is provided on one side of the floating body 2.

To compensate for a change in viscosity, the two actuating elements 5 are designed such that their spring constants are dependent just enough on the temperature that they compensate completely or at least to a known extent for the impact of a change in the viscosity of the medium on the position of the floating body 2. Thus, for example, if the viscosity of the medium changes as a result of the temperature such that the floating body 2 rises further up than would be suitable for the flow of the medium, the upper actuating element 5 presses, as a result of the temperature change, the floating body 2 further down due to the changed spring constant, so that the floating body 2 is returned to the position that corresponds to the flow of the medium and which is thus also related to a certain "reference viscosity". Such springs are referred to as thermo variable rate springs (see, e.g., "Thermo Variable Rate Springs: A New Concept for Thermal Sensor-Actuators" by Dieter Stoeckel and Tom Waram, *Springs-The Magazine of Spring Technology*, Vol. 30, No. 2, pp. 35-42, October 1991).

Figure 2:
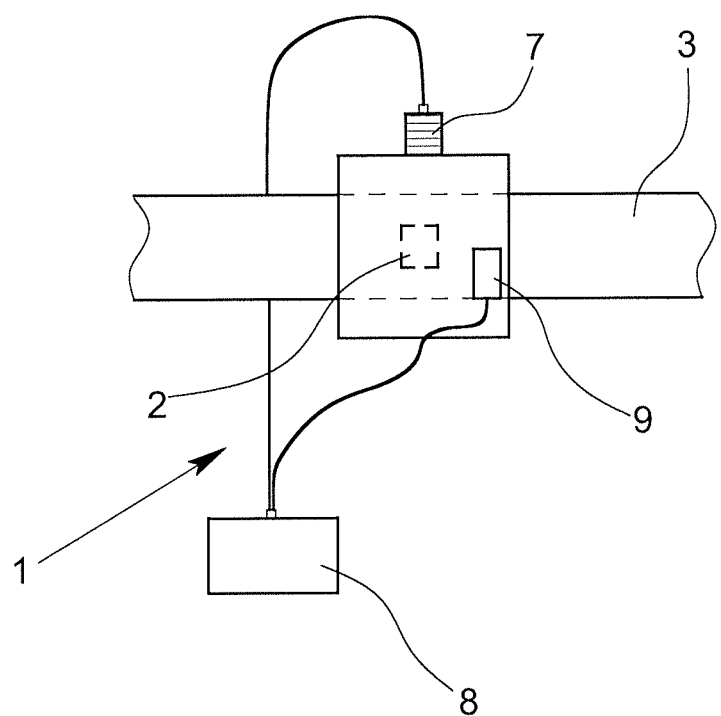

In the device 1 of FIG. 2, the measuring tube 3 is disposed horizontally, so that also the floating body 2 moves horizontally as a result of the flow of the medium (preferably against a spring, not shown here). The position of the floating body 2 is determined by a position-determining unit 7. This works, for example, in that the floating body 2 is provided with a permanent magnet whose position is determined outside of the measuring tube.

The determined position of the floating body 2 is transferred to the evaluation unit 8, which determines a value for the flow of the medium on the basis of, for example, stored data.

In the illustrated embodiment, a temperature sensor 9 is additionally provided for detecting the temperature of the medium, which also transmits its data to the evaluation unit 8. Such a temperature sensor 9 allows for the appropriate adjustment of the extent of the re-positioning force of at least one actuating element 5 via the measurement of the temperature in a particular embodiment.

What is claimed is:

1. Device for determining the flow of a flowing medium according to the float principle, comprising:
   at least one floating body,
   at least one measuring tube with medium flowing through it,
   wherein the floating body is movable in the measuring tube along a lengthwise axis thereof, and
   wherein at least one actuating element is arranged between the at least one floating body and a supporting element,
   wherein the at least one actuating element is a spring element having a temperature-variable spring constant, and
   wherein the at least one actuating element is able to exert a force on the at least one floating body along the axis in a direction one of in a flow direction of the medium and against the flow direction of the medium.

2. Device according to claim 1, wherein at least one position-determining unit is provided which determines the position of the floating body within the measuring tube, and
   wherein at least one evaluation unit is provided which determines a value for the flow of the medium from the position of the floating body.

3. Device according to claim 1, wherein at least one temperature sensor is provided for determining the temperature of the medium.

* * * * *